United States Patent [19]
Tamagaki et al.

[11] Patent Number: 6,040,924
[45] Date of Patent: Mar. 21, 2000

[54] COLOR IMAGE FORMING APPARATUS

[75] Inventors: Akira Tamagaki, Souraku-gun; Yoichi Shimazawa; Hideo Matsuda, both of Nara; Syoichiro Yoshiura, Tenri, all of Japan

[73] Assignee: Sharp Kabushiki Kaisha, Osaka, Japan

[21] Appl. No.: 09/103,670

[22] Filed: Jun. 23, 1998

[30]    Foreign Application Priority Data

Jun. 24, 1997  [JP]  Japan ................................ 9-167592

[51] Int. Cl.⁷ .............................. G03F 3/08; H04N 1/21; B41B 15/00; B41J 15/00; G06F 15/00
[52] U.S. Cl. ......................... 358/523; 358/296; 395/115
[58] Field of Search .................... 395/101, 115, 395/116; 358/296, 515, 523; 399/178

[56]            References Cited

U.S. PATENT DOCUMENTS

| | | | |
|---|---|---|---|
| 4,558,356 | 12/1985 | Toda et al. | 358/515 |
| 4,639,770 | 1/1987 | Jung et al. | 358/527 |
| 4,931,815 | 6/1990 | Sato et al. | 347/116 |
| 5,323,488 | 6/1994 | Udagawa | 395/115 |
| 5,604,578 | 2/1997 | Shibuya et al. | 399/178 |
| 5,659,673 | 8/1997 | Nonoshita | 395/131 |

FOREIGN PATENT DOCUMENTS

| | | |
|---|---|---|
| 1-45632 | 4/1982 | Japan . |
| 61-265964 | 11/1986 | Japan ........................ H04N 1/387 |
| 3-248865 | 11/1991 | Japan . |

*Primary Examiner*—Kimberly A. Williams
*Attorney, Agent, or Firm*—Dike, Bronstein, Roberts & Cushman, LLP; David G. Conlin; William J. Daley, Jr.

[57]            ABSTRACT

An image data input portion captures one line of data. The captured RGB data is color-converted into image information of a different set of colors, through the image processing portion. The converted data is written at a set up address on an HD. One page of image information is written onto the HD whilst the HD's address is sequentially incremented by 2. When two colors of data need to be retrieved in parallel from the HD, the data of the colors can be alternately written in. A CPU controls tandem recording units Pa, Pb, Pc and Pd so as to perform printing of respective colors, with a time shift one to the next of a period equal to the pitch of photoreceptor recording units.

10 Claims, 18 Drawing Sheets

COLOR IMAGE FORMING APPARATUS

BACKGROUND OF THE INVENTION

(1) Field of the Invention

The present invention relates to a color image forming apparatus capable of inputting image information such as a color original etc., by color separation, and more particularly relates to a color image recording apparatus which stores color-separated image information in rotary-type storage media such as hard disks or the like, and reads the image information stored in the rotary-type storage media so as to transfer the data to the image recording section and reproduce the color image.

(2) Description of the Prior Art

In a color image forming apparatus, for example, a digital color copier, the image of an original captured by the scanner is subjected to predetermined image processings, and then is output as a color copy from the printer unit. In the field of digital color copiers, it is necessary to provide products which make the best use of colors and digital features.

Because of such demands, recent digital copiers tend to have a configuration in which the image of a color original is stored into the memory so as to modify the color image into a richer representation, or tend to have high performance configurations with many editing functions such as editing a plurality of color images in parallel.

For example, Japanese Patent Publication Hei 1 No. 45,632, discloses a color image forming apparatus with which the image of a color original is separated in color and read by a color CCD and the thus captured color-separated images of the color original are stored into the memory, then the data is sequentially read out therefrom to reproduce a color image through the recording portion.

In accordance with the color image forming apparatus written in this disclosure, color-separated images of the color original picked up by the color CCD are temporarily stored in buffer memory for individual colors. Then, the thus stored color-separated sets of image information are successively read from the buffer memory and are input to the semiconductor laser, which, based on the color-separated sets of image information, reproduces toner images of different colors on respective photoreceptors. Finally, the images of the different colors are superimposed on the copy medium on the transfer drum, thus producing a color image.

In view of the above configuration, the remaining sets of color image information other than that currently engaged for recording need to be stored until they can be used. Therefore, the buffer memory in which each color set of color-separated image information is temporarily stored needs a memory capacity at least equal to the amount of data of the maximum copy size (e.g., A3). Further, in order to produce a correct reproduction from a color original, the scanner portion for scanning the original needs to be developed into a high resolution one.

The color image information picked up by the scanner with a high resolution, however, has a huge data size. Moreover, the image information must be stored for each color-separated set of image data, so the memory for storing the image data needs to be of a large capacity. This situation is the same when the image information of a color original is subjected to special image processing. Specifically, implementation of image processings which increases the image data size, such as resolution conversion, magnification conversion, image gradation conversion, etc., needs storage of a large capacity for storing the image data. The color images handled in a digital color copier of this type, are controlled as color separated image data, and the data amount of a digital image tends to be very large in the pursuit of an improved quality of image. Accordingly, recent machines need a storage device of a greater capacity than that in the conventional machines. Further, digital color copiers, need to store three sets of color separated data, i.e., Y, M and C, and an extra set of data for Bk which is detected from Y, M and C colors, needing about four-fold memory capacity.

Recently, the price of semiconductor memory devices as a large capacity storage device has become lower, yet the memory device of a greater capacity becomes proportionally expensive, giving rise to a big problem even in view of the total product cost of a digital color copier. For this reason, if a digital color copier having high capacity memory devices is attempted to be commercialized, the price becomes very expensive, which hinders the spread onto the market in the present stage.

SUMMARY OF THE INVENTION

It is therefore an object of the present invention to provide an color image forming apparatus in which with use of storage media having high storage capacity, the storage of the image data is controlled in accordance with the timing of the data being stored in the recording driver so that the color-separated image information of colors will be efficiently read out therefrom and hence the necessary image data is efficiently read out and transferred to the recording section.

In order to achieve the above object, the present invention is configured as follows:

In accordance with the first aspect of the invention, a color image forming apparatus comprises:

an input means for capturing color image information as color-separated sets of image information;

a color converting means for color-converting the color-separated sets of image information input through the input means into color-converted sets of image information;

a rotary type storage means for storing the color-converted sets of image information;

a writing means for writing plural color-converted sets of grouped image information, onto the rotary type storage means;

a reading means for reading the color-converted sets of image information from the rotary type storage means; and color image forming means for reproducing different color images corresponding to the color-converted sets of image information, retrieved by the reading means, wherein the writing means can designate addresses at which color-converted sets of image information of different colors are written on the rotary type storage means in an alternating or cyclic manner in accordance with the number of the color-converted sets of image information to be read in parallel from the rotary type storage means by means of the reading means.

In accordance with the second aspect of the invention, the color image forming apparatus having the above first configuration is characterized in that the writing means separates the addresses into a first group of addresses and a second group of addresses so that the first and second groups of addresses are successively and alternately set up for the color-converted sets of image information.

In accordance with the third aspect of the invention, the color image forming apparatus having the above first configuration is characterized in that the writing means separates the addresses into a first group addresses and a second group of addresses and further separates the color-converted sets of image information into a first set of image information and a second set of image information based on the color so that the first set of image information and the second set of image information are successively written into the storage locations at the first and second group addresses, respectively.

In accordance with the fourth aspect of the invention, the color image forming apparatus having the above first, second or third configuration is characterized in that the reading means sequentially designates addresses for each color based on the addresses set up by the writing means so as to successively retrieve color-converted sets of image information, separately for each color and supply the retrieved sets of image information to the respective color image forming means.

In accordance with the fifth aspect of the invention, the color image forming apparatus having the above first configuration is characterized in that the writing means sets up and controls addresses of the areas to which each color-converted set of image information of a color is written in, and the reading means reads the color-converted sets of image information by sequentially designating addresses and determines which color the retrieved color-converted set of image information corresponds to based on the address area set up by the writing means and supplies each set of image information of a color to the color image forming means corresponding to the color.

In accordance with the sixth aspect of the invention, a color image forming apparatus comprises:

an input means for capturing color image information as color-separated sets of image information;

a color converting means for color-converting the color-separated sets of image information input through the input means into color-converted sets of image information;

a rotary type storage means for storing the color-converted sets of image information;

a writing means for writing plural color-converted sets of grouped image information, onto the rotary type storage means;

a reading means for reading the color-converted sets of image information from the rotary type storage means; and a color image forming means for reproducing different color images corresponding to the color-converted sets of image information, retrieved by the reading means, wherein the rotary type storage means is composed of a plurality of rotary storage media which each separately stores a first color-converted set of image information to be used for image forming at an odd-numbered order and a second color-converted set of image information to be used for image forming at an even-numbered order; the writing means writes the color-converted sets of image information to the corresponding rotary storage media in the rotary type storage means; and the reading means sequentially reads color-converted sets of image information from respective rotary storage media, in the necessary order when the color image forming means needs to perform image forming.

In accordance with the seventh aspect of the invention, the color image forming apparatus having the above sixth configuration is characterized in that the writing time and reading time of image information for the plurality of rotary storage media are all approximately equal to one another.

In accordance with the eighth aspect of the invention, the color image forming apparatus having the above sixth configuration is characterized in that the color image forming means comprises a plurality of image forming units arranged one to the next so that each unit reproduces a different color image; the writing means stores the color-converted sets of image information required for the image forming means into respective rotary storage media, in the order of the arrangement of the image forming units.

In accordance with the ninth aspect of the invention, the color image forming apparatus having the above sixth configuration is characterized in that the input means is a scanning-type color scanner for scanning the original image surface and capturing the color separations of the original image; and the writing means writes the color-converted sets of image information captured for each scanning of the input means, into the respective rotary storage media.

In accordance with the tenth aspect of the invention, the color image forming apparatus having the above sixth configuration is characterized in that the color image forming means is composed of the first through fourth image forming units arranged one to the next so that each unit reproduces a different color image; the rotary type storage means is composed of the first and second storage media; and the writing means is constructed so that color-converted sets of image information required for the first and third image forming units are stored into the first storage medium and color-converted sets of image information required for the second and fourth units are stored into the second storage medium.

In accordance with the first, second and third configurations, the addresses of the data are set up in accordance with the number of the color-converted sets of image information to be retrieved in parallel from the rotary type storage means by the reading means, in such a manner that color-converted sets of image information of different colors are written into the rotary type storage means, in an alternating manner. Accordingly, when the color-converted sets of image information of plural colors need to be read in parallel during image forming, the image information can be alternately arranged on the storage means. Therefore, it is possible to read out color-converted sets of image information of plural colors almost at the same time and hence achieve a high speed retrieval of the data.

In accordance with the fourth and fifth configurations, the reading means reads out the color-converted image information written in the rotary type storage means, by successively designating the addresses therein, thus enabling high speed retrieval of the data. In particular, in the fourth configuration, since each color set of image information is read out separately, the processing for each color can be readily controlled. In the fifth configuration, since addresses are sequentially designated to read out the image information, the processing can be effected efficiently without break.

In accordance with the sixth configuration, the input color-separated sets of image information are color converted and the color-converted sets of image information are controlled so as to be stored into respective rotary storage media, by taking into account the necessary order of the recorded sets of image information for color image forming means. Accordingly, the sets of image data can independently be at high speed written in, and at high speed retrieved, from respective rotary storage media.

Accordingly, a color image of high quality and hence of a large data size, can be efficiently processed at high speed. Further, since the color-converted sets of image information are stored into plurality of independent rotary storage media, it is possible to effect the writing and reading processes of the image information so as not to coincide with one another. As a result, it is possible to efficiently write in and read out large-sized image information.

In accordance with the seventh configuration, the writing time and reading time of image information required for the plurality of rotary storage media are all approximately equal to one another. Accordingly, writing and reading of the image information for all the rotary storage media can be controlled with the same timing, thus making it possible to simplify the control of the processing without stoppage.

In accordance with the eighth configuration, the writing means stores the color-converted sets of image information required for the image forming units into respective rotary storage media, in the order of the arrangement of the image forming units. Accordingly, only reading of the image information in the storing order and subsequent transfer of the data to the image forming units are needed, thus making it possible to achieve efficient processing.

In accordance with the ninth configuration, a plurality of rotary storage media are adapted to independently control the storage of the image information. Accordingly, the overlaps between the processing of storing the image information captured by the scanner and the processing of reading the image information and subsequent data transfer can be avoided as much as possible, therefore it is possible to perform the operation of the machine without stoppage.

In accordance with the tenth configuration, color-converted sets of image information required for the first and third image forming units are stored into the first storage medium and color-converted sets of image information required for the second and fourth image forming units are stored into the second storage medium. Accordingly, the processing of storing the image information and the reading and subsequent transfer of the image information can be effected efficiently.

DESCRIPTION OF THE PREFERRED EMBODIMENTS

The embodiments of the invention will hereinafter be described in detail with reference to the accompanying drawings.

Figure 1:
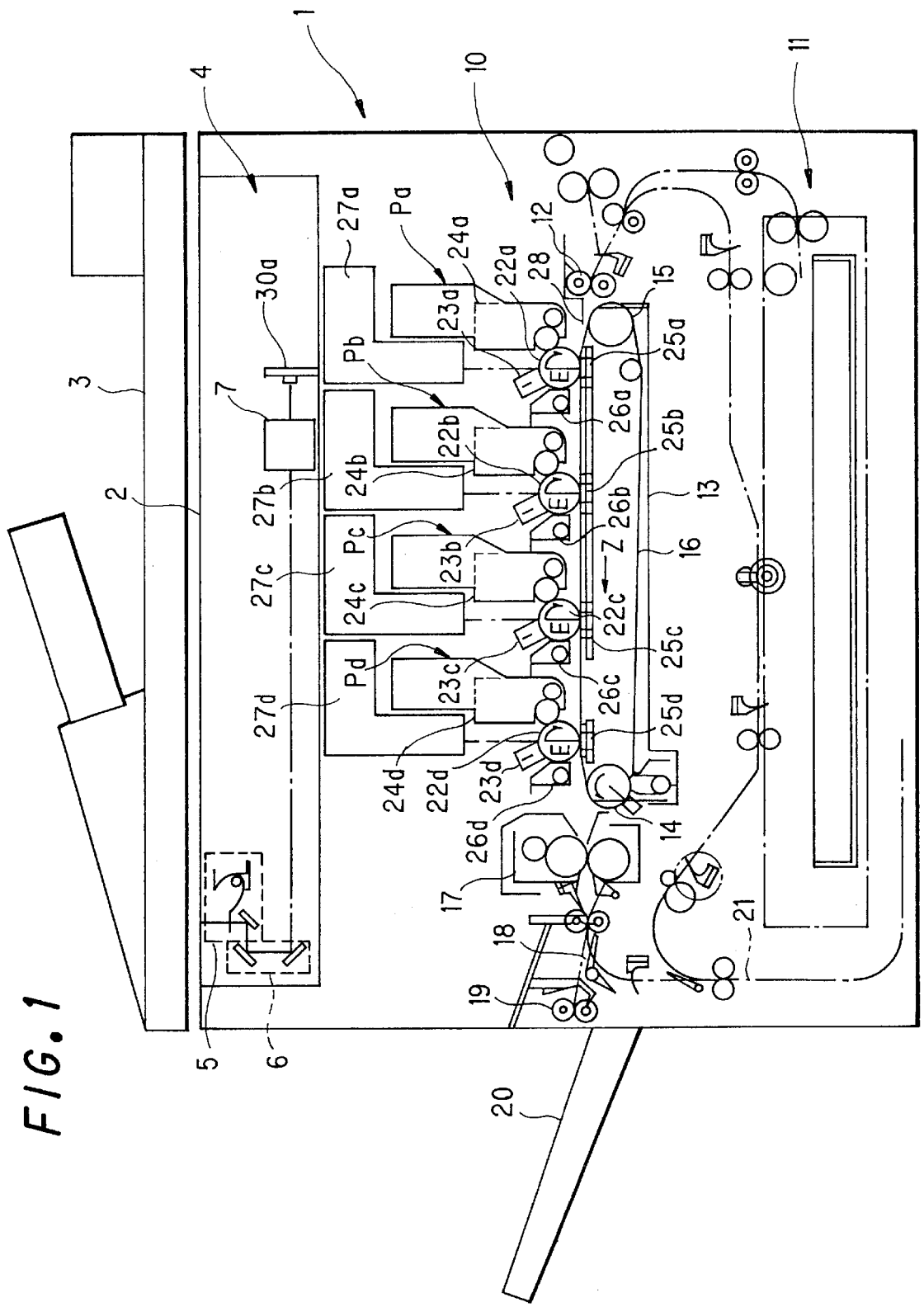
FIG. 1 is a diagram showing the overall configuration of a digital color copier as the image forming apparatus in accordance with the invention.

FIG. 1 is an overall front sectional view showing the configuration of a digital color copier as the image forming apparatus of the invention. Provided on the top of a copier body 1 are an original table 2 and a control panel while an automatic document feeder 3 is mounted on the top of original table 2. The automatic document feeder 3 is positioned with the predetermined relationship relative to the surface of original table 2 and supported so as to be opened and closed relative to original table 2. Further, copier body 1 incorporates an original scanner 4 as the image reading portion and an image forming portion 10.

First, automatic document feeder 3 is mounted over original table 2, i.e., on the top of copier body 1. This feeder is a reversing automatic document feeder 3 capable of handling double-sided originals. An original A is fed so that one side thereof opposes original table 2 at the predetermined position. After completion of reading the image on one side, original A is inverted and fed so that the other side opposes original table 2 at the predetermined position.

When the images on both sides of one original have been captured, this original is discharged and the duplex feeding operation of the next original will be effected. The operations of feeding original A and inverting the original are controlled in conformity with the operation of the whole copier. In order to capture the image of original A fed onto original table 2 by reversing automatic document feeder 3, original scanner 4 is provided so as to reciprocally move in parallel along the underside of original table 2.

This original scanner 4 composes a first scanning unit 5, second scanning unit 6, optical lens 7 and photoelectric converting element 30a. The first scanning unit 5 is composed of an exposure lamp for illuminating the original image surface and the first mirror which deflects the reflected light from the original in the predetermined direction. This scanning unit 5 is located under the original table and moves back and forth at the predetermined scanning speed in parallel with and spaced from, the undersurface of the original table. The second scanning unit 6 is composed of the second and third mirrors which move back and forth in a parallel manner keeping a certain speed relationship relative to the first scanning unit 5. The light reflected on the original and deflected by the first mirror of the first scanning unit 5 is further deflected by this second scanning unit in the predetermined direction. Optical lens 7 focuses the light reflected off the original and deflected by the third mirror of the second scanning unit, on the predetermined position forming a reduced image in size. Color CCD 30a as the photoelectric converting element photo-electrically converts the image of light reduced and focused by optical lens 7 to produce an electric signal representing the reflected image of light from the original. The original image information thus converted into an electric signal by this color CCD 30a is then transferred to an image processor 31, to be described hereinbelow, where the signal is appropriately processed as image data.

Next, image forming portion 10 located in the lower side of copier body 1 will be described. Provided at the bottom of image forming portion 10 shown in FIG. 1 is a paper feeder mechanism 11, which separates sheets one by one from a stack of sheets accommodated in the sheet tray and feeds the sheet toward the recording station. The sheet thus separated and fed one by one is timing controlled and fed by a pair of resist rollers 12 located before image forming portion 10. For duplex printing, the sheet is re-fed and conveyed in synchronization with the operation of image forming portion 10.

Provided in the lower part of image forming portion 10 is a transfer conveyor belt mechanism 13 extending in a substantially parallel manner with the image forming portion. This transfer conveyor belt mechanism 13 is composed of a transfer conveyer belt 16 wound between a plurality of rollers such as a driving roller 14, driven roller 15 and the like so that the belt electrostatically attracts the paper thereto to convey it.

Provided on the downstream side of transfer conveyer belt mechanism 13 is a fixing unit 17 for fixing the toner image that has been transferred to the paper, onto the paper. The paper passes through the fixing roller nip of fixing unit 17 and further passes through a sheet path switching gate 18 and then discharged by a discharge roller 19 onto paper output tray 20 attached to the exterior wall of the machine.

Switching gate 18 is provided to select one of the two sheet paths, that is, one for discharging the sheet after fixing and the other for re-feeding the sheet to image forming portion 10. For duplex printing, the path of the sheet is switched by switching gate 18 so that the sheet is guided to the re-feeding path to image forming portion 10, and then is inverted upside down through a switch-back conveyance path 21 to be re-fed to image forming portion 10.

Arranged closely over the transfer conveyer belt 16 which is stretched in a substantially parallel manner between driving roller 14, driven roller 15 and the like, are the first, second, third and fourth image forming stations Pa, Pb, Pc and Pd arranged in parallel, in this order from the upstream side with respect to the sheet conveying direction. Transfer conveyor belt 16 is frictionally driven by the direction shown by arrow Z in FIG. 1 by means of driving roller 14, carrying the sheet as copy material which is fed by sheet feeder mechanism 11 as already explained. In this way, the sheet is successively conveyed through image forming stations Pa, Pb, Pc and Pd.

Image forming stations Pa, Pb, Pc and Pd have substantially the same configuration, and include photoreceptor drums 22a, 22b, 22c and 22d, respectively, each being rotated in the direction of arrow E in FIG. 1. Provided around photoreceptor drum 22a, 22b, 22c and 22d, are a charger 23a, 23b, 23c and 23d for uniformly charging the photoreceptor drum, a developing unit 24a, 24b, 24c and 24d for developing the static latent image formed on the photoreceptor drum, a transfer charger 25a, 25b, 25c and 25d for transferring the toner image thus developed to the sheet and a cleaning device 26a, 26b, 26c and 26d for removing the leftover toner from the photoreceptor drum. These components are arranged around the photoreceptor drum in the above-mentioned order with respect to the rotational direction of the photoreceptor drum.

Provided above photoreceptor drums 22a, 22b, 22c and 22d are laser beam scanner units 27a, 27b, 27c and 27d, respectively. Each laser beam scanner unit includes a semiconductor laser element emitting a spot beam of light being moderated with image data, a deflecting device for deflecting the laser beam from the semiconductor laser element in the main scan direction, and an f-θ lens for focusing the laser beam deflected by the deflector onto the photoreceptor surface.

Input to laser beam scanner 27a is the pixel signal corresponding to the yellow component image of a color original image; input to laser beam scanner 27b is the pixel signal corresponding to the magenta component image of a color original image; input to laser beam scanner 27c is the pixel signal corresponding to the cyan component image of a color original image; and input to laser beam scanner 27d is the pixel signal corresponding to the black component image of a color original image.

In this arrangement, a static latent image corresponding to the color-converted original image information is formed on the corresponding photoreceptor drum 22a, 22b, 22c and 22d in each recording unit. Each recording station holds a different color toner, that is, yellow toner in developing unit 24a, magenta toner in developing unit 24b, cyan toner in developing unit 24c and black toner in developing unit 24d, respectively. Accordingly, in each recording station, the color-converted original image information is reproduced as a toner image having each individual color.

A paper attraction (brush-like) charger 28 is provided between the first image forming station Pa and sheet feeder mechanism 11. This paper attraction charger 28 charges the surface of transfer conveyer belt 16 so that the belt will be able to convey the paper as the copy paper, fed from paper feeder mechanism 11 from the first image forming station Pa to the fourth image forming station Pd whilst tightly attracting it thereon without causing any slippage or displacement.

A charge erasing device (not shown) is provided approximately above driving roller 14 between the fourth image station Pd and fixing unit 17. This charge erasing device is applied with an alternating current so as to separate the sheet which is electrostatically attracted to conveyer belt 16.

In the thus configurated digital color copier, cut-sheet paper is used as the copy material. This copy sheet is delivered out from the paper cassette and fed into the guide to the sheet conveying path of paper feeder mechanism 11, then the leading part of the copy sheet is detected by the aforementioned sensor (not shown). Then the copy sheet is halted at resist roller pair 12 based on the detection signal output from the above sensor. Thereafter, the sheet is conveyed toward conveyor belt 16 running in the direction of arrow Z in FIG. 1, at a time synchronized with the operations of image forming stations Pa, Pb, Pc and Pd. During conveyance, the sheet will be conveyed stably passing through image forming stations Pa, Pb and Pc and Pd since conveyer belt 16 has been charged appropriately by paper attraction charger 28 mentioned above.

In each image forming station Pa, Pb, Pc and Pd, a toner image of a different color is formed by the aforementioned arrangement, and each toner image is superimposed over the support surface of the copy sheet being electrostatically attracted to and conveyed by conveyer belt 16. When the transfer of the image in the fourth image forming station Pd has been completed, the copy sheet, specifically the leading edge of the paper, is separated from conveyer belt 16 with the help of the charge erasing charger, and is conveyed to fixing unit 17. Finally, the copy sheet with a toner image fixed thereon is discharged through the copy sheet output port to paper output tray 20.

(Illustration of the Circuit of the Image Processing Unit)

Next, the configuration and function of the image processing unit of the color image information, installed in the digital color copier, will be described.

Figure 2:
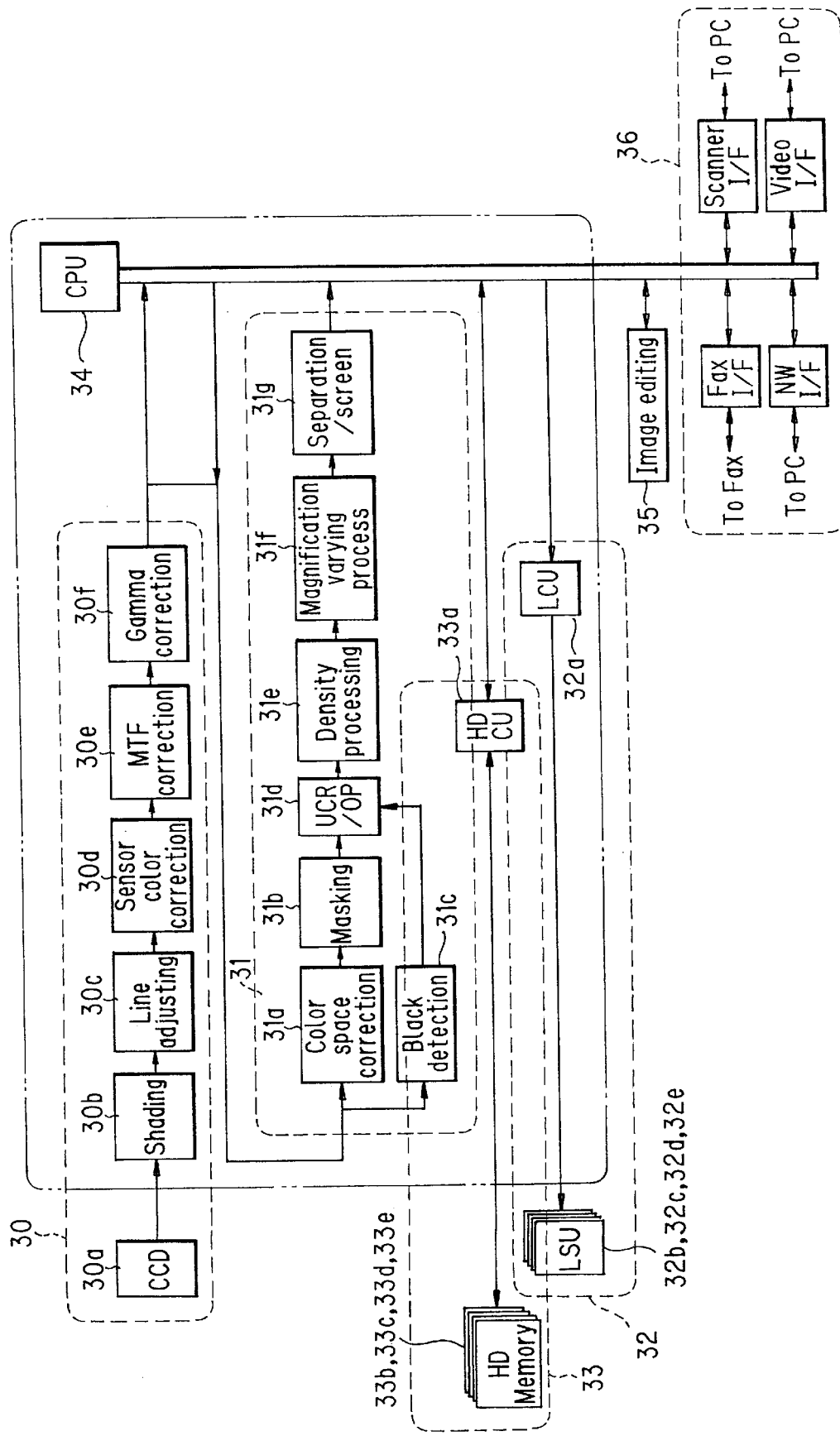
FIG. 2 is a block diagram of an image processing unit for processing color image information, installed in a digital color copier.

FIG. 2 is a block diagram showing an image processing unit contained in the digital color copier. The image processor contained in this digital copier comprises an image data input portion 30, image processing portion 31, image data output portion 32, image memory 33 composed of hard disk drivers etc., a central processing unit (CPU) 34, an image editing portion 35 and an external interface portion 36.

Image data input portion 30 includes: a three-line color CCD 30a capable of capturing a color original image and outputting RGB color separated line data, also shown in FIG. 1; a shading correcting circuit 30b for correcting the line image level of the line data captured by color CCD 30a; a line adjusting portion 30c with line buffers to correct the displacement of line data; a sensor color correcting portion 30d for correcting color data of the line data for each color; an MTF correcting portion 30e for correcting or enhancing the signal for every pixel; and a gamma-correcting portion 30f for performing a visual sensitivity correction by adjusting the brightness of the image.

Image processing portion 31 comprises: a color space correcting circuit 31a; a masking circuit 31b; a black component detecting circuit 31c, an under color removal/black adding circuit (UCR/BP) 31d; a density processing circuit 31e; a magnification varying circuit 31f; separation/screen circuit 31g.

Here, color space correcting circuit 31a adjusts the reproducible color range of the color image signal being input through image data input portion 30 or an aftermentioned interface portion 36, to the reproducible color range of the color toner in the recording apparatus. Masking circuit 31b converts the RGB signals of the input image data into the YMC signals corresponding to the recording units of the recording apparatus. Black component detecting circuit 31c detects the black component from the RGB signals of the color image being input through image data input portion 30 or aftermentioned interface portion 36. Under color removal/black adding circuit 31d, based on the YMC signals being output from masking circuit 31b, performs black addition of the black component signal being output from black component detecting circuit 31c. Density processing circuit 31e adjusts the density of the color image signal based on a density converting table. Magnification varying circuit 31f varies the magnification of the input image information based on the selected magnification. Separation/screen circuit 31g detects characters, photography, halftone areas in the image information, from the input image data to separate the areas one from another and determine the output pattern of the image.

Image data output portion 32 comprises: a laser control unit 32a for performing pulse-width modulation based on the image data of each color; and laser scanner units (LSU) 32b, 32c, 32d and 32e for the different colors to perform laser recording based on the pulse width modulated signals in accordance with image signals for the different colors output from laser control unit (LCU) 32a.

Image memory 33 is composed of: a hard disk control unit (HDCU) 33a, which successively receives four color sets of 32 bit image data (8 bits for each color) output from image processing portion 31, temporarily stores the data in the buffer and converts the 32 bit data into four sets of 8 bit image data (for four colors) in order to separately control them into the four hard discs; and four hard disks (HD) 33b, 33c, 33d and 33e for separately storing and controlling the 8 bit image data of respective colors. Here, four hard disks are used but this is an example of a maximum case so the following embodiments include configurations with one, two and four hard disks.

Central processing unit (CPU) 34 controls image data input portion 30, image processing portion 31, image data output portion 32, image memory 33, image editing portion 35 and external interface portion 36 (the latter two will be detailed hereinbelow), based on the predetermined sequence.

Image editing portion 35 performs predetermined image editing of the image data which is stored temporarily in image memory 33 after being processed through image data input portion 30, image processing portion 31 or interface portion 36 to be described hereinbelow. Interface portion 36 is a communication interface means for receiving the image data from an external image input processing unit separately provided outside the digital copier. Examples of external input include a facsimile machine, a scanner, video and image data from a network.

Image data input from interface portion 36 is also temporarily input into image processing portion 31 where color space correction etc. Is performed, so that the data is level converted so as to be handled by the image memory 33 of the digital copier. Then, the thus processed data is stored in and controlled by hard discs 33b, 33c, 33d and 33e.

(Explanation of the Control System of the Whole Digital Copier)

Figure 3:
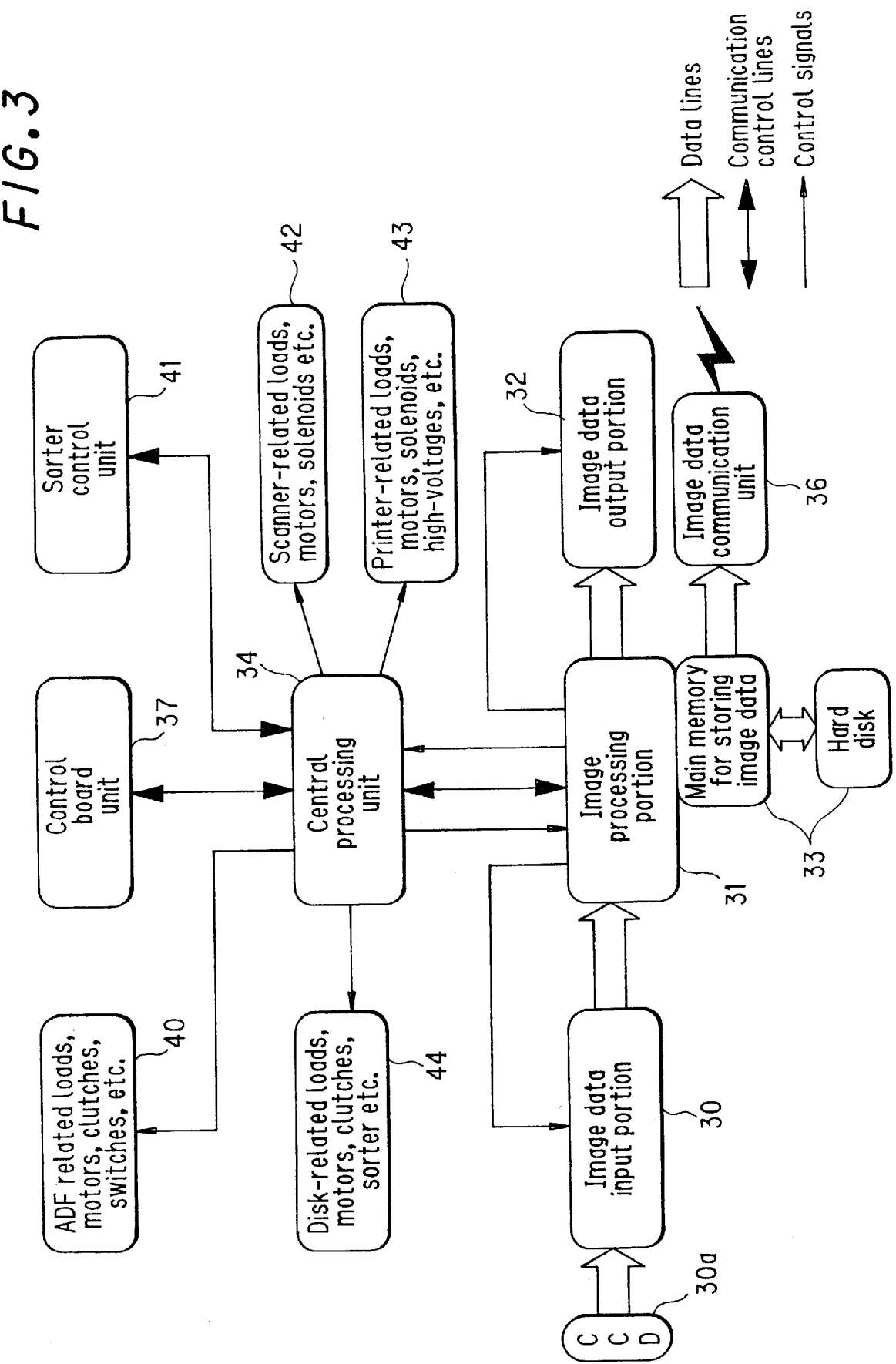
FIG. 3 is a block diagram showing a digital color copier.

FIG. 3 is a block diagram showing the units in the digital copier showing the state where CPU 34 controls the operations of different units. Explanation concerning Image data input portion 30, image processing portion 31, image data output portion 32, image memory 33 and CPU 34 is contained in FIG. 2 and is omitted.

CPU 34 performs sequence control of each driver mechanism constituting the digital copier, such as ADF 40, a sorter unit 41, a scanner unit 42, laser printer unit 43, disk related loads 44 and output control signals to these units. Further, CPU 34 is connected to control board unit 37 made up of a control panel in an inter-communicable manner so that control signals in accordance with the copy mode designated by the operator are transferred to CPU 34 to thereby operate the digital copier in accordance with the setup mode.

CPU 34 issues a control signal representing the operating state of the digital copier to control board unit 37. The control board unit 37 side, based on this control signal, displays the operating state through a display etc., so as to inform the operator of in what state the copier is.

Image data communication unit 36, as has been described in FIG. 2, is provided to enable communications of information such as image information, image control signals, etc., with other digital image appliances.

Next, the embodiments of the invention are hereby described in which the image information is temporarily stored into the hard disks and the information is read therefrom to perform an image forming operation.

(The First Embodiment)

Figure 4:
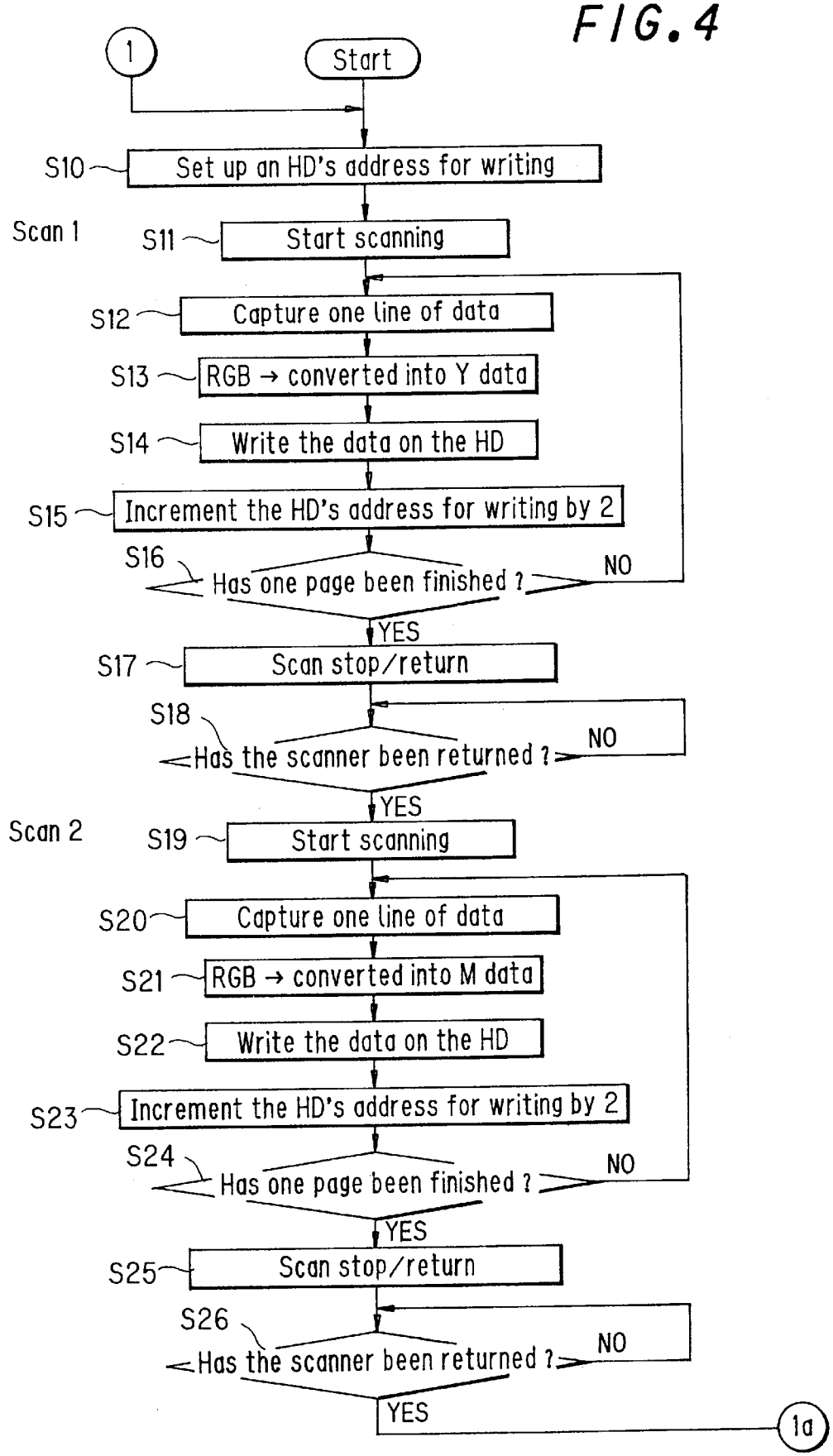
FIG. 4 is the first part of a flowchart for illustrating the operation of a CPU writing into a HD in the first embodiment.
Figure 5:
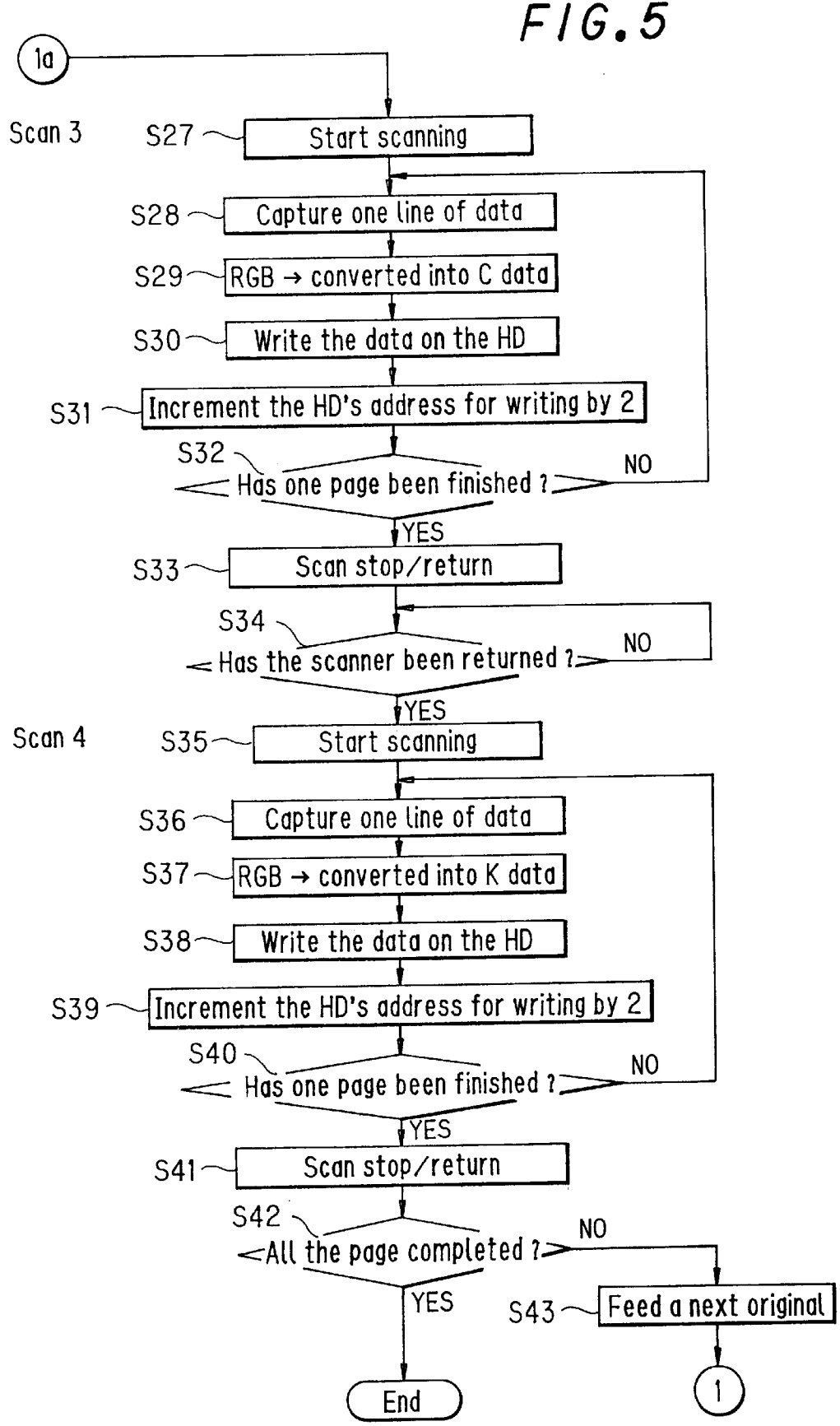
FIG. 5 is the second part of a flowchart (following that in FIG. 4) for illustrating the operation of a CPU writing into a HD in the first embodiment.

The first embodiment is a digital color copier having a hard disk driver 33b in FIG. 2. FIGS. 4 and 5 show a flowchart showing a write operation of the CPU into the HD in accordance with the first embodiment.

Referring to FIG. 4, the control during scanning the original will be explained. First, a writing address in HD 33b is set up (Step S10) and scanning of the original is started (Step S11). In this operation, the light reflected on the original is focused on CCD 30a of original scanner 4 as the image reading portion.

Next, one line of data is taken through image data input portion 30 (Step S12) into image processing portion 31 where the RGB data is converted into the Y data (Step S13). The thus converted Y data is written into the location at the writing address set up in HD 33b (Step S14).

Then the address value for writing in HD 33b is incremented by 2 (Step S15) and it is judged whether writing for one page has been completed (Step S16).

Steps S12 to S16 are repeated in order to complete the write operation of the Y data of one page scanned by the first scanning operation of the original, into HD 33b.

When the image data for one page has been completed, scanning of the original is stopped to return original scanner 4 to the home position from where the original scanning is to be started (Step S17). Step S18 is the step of waiting for the completion of original scanner 4 to return to its home position.

Similarly, in the second original scan, one page of the M data is written onto HD 33b from Steps S19 to S26. Further, as shown in FIG. 5, the third original scan is performed for one page of the C data to be written onto HD 33b from Steps S27 to S34. Finally, the fourth original scan is implemented for one page of the K data to be written onto HD 33b from Steps S35 to S41.

In the above way, a color original is scanned four times to produce YMCK data, and the thus produced image information of the original is written page-wise onto HD 33b.

Then, it is judged whether all the originals have been finished to be scanned (Step S42). If the judgment is negative, a next original is fed (Step S43) to return to Step S10, from where a similar scanning operation to the first original is effected for the next original. When the judgment is affirmative, the original scanning operation is ended.

Figure 6:
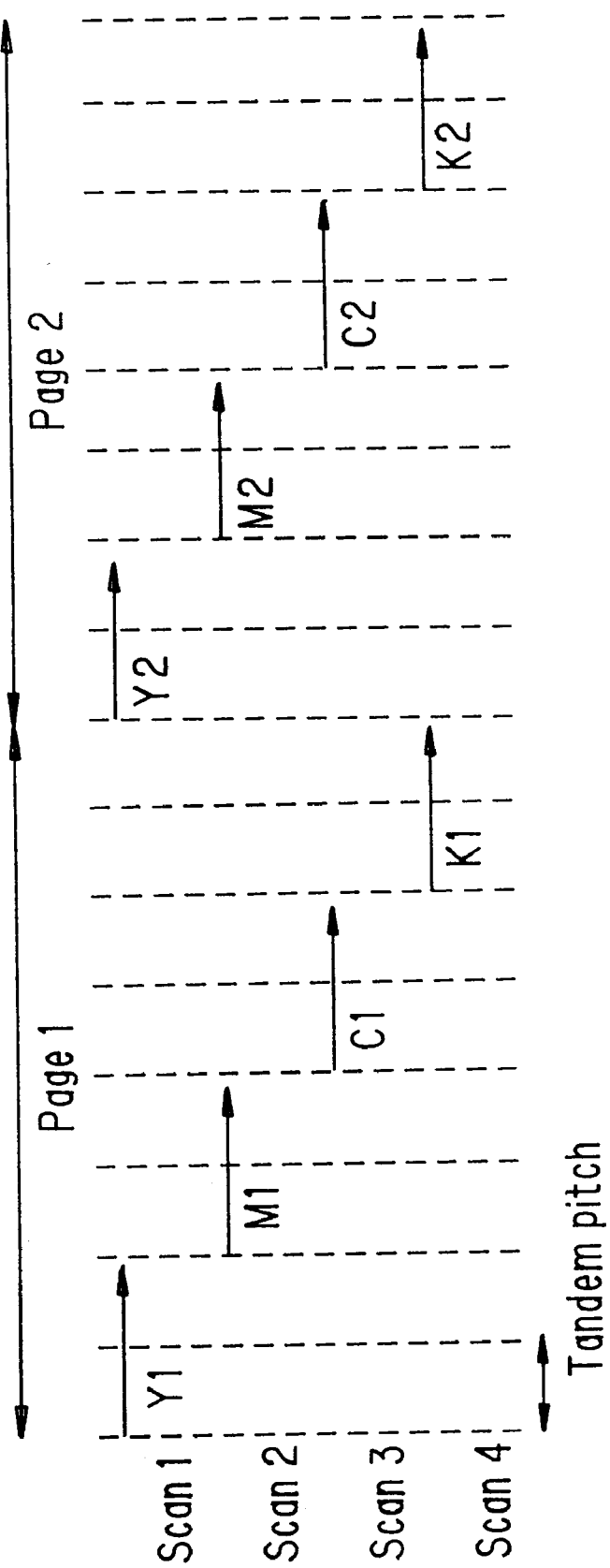
FIG. 6 is a timing chart showing the operation of capturing image data by scanning an original in the first embodiment.
Figure 7:
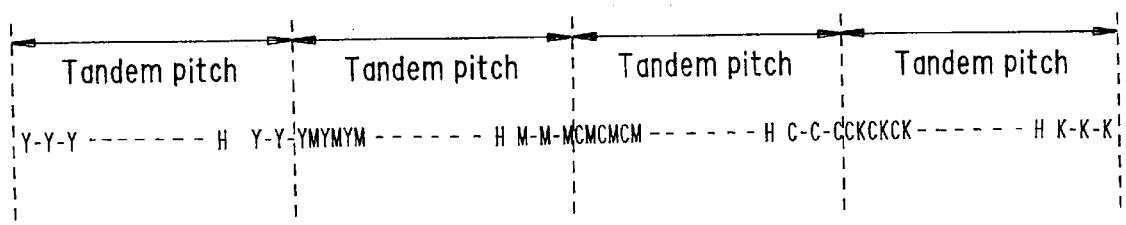
FIG. 7 is an illustrative diagram showing the order of writing of image data onto HD in the first embodiment.
Figure 8:
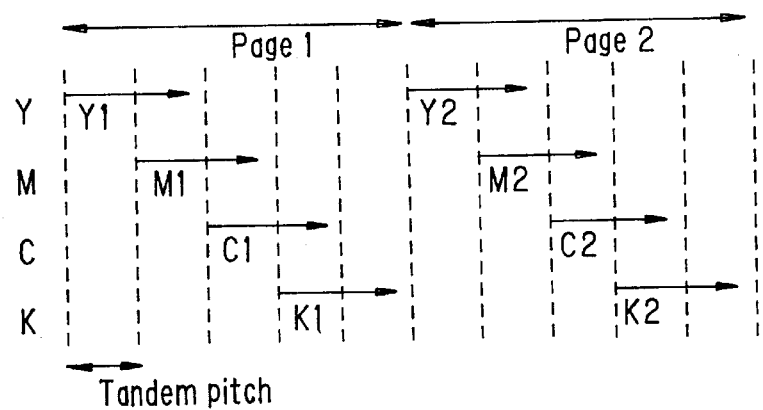
FIG. 8 is a timing chart showing the operation of reading the image data from HD in the first embodiment.

Next, the designation of the writing address will be explained. FIG. 6 is a chart showing the timing of capturing the image data during the original scan operation. FIG. 7 is an illustrative view showing the order of writing the image data onto the HD. FIG. 8 is a timing chart showing the timing of reading the image data from the HD.

Here, it is assumed that in the digital copier, the scan speed (the speed of movement of original scanner 4) corresponds to the speed of printing (the speed of conveyance of the paper). A term 'tandem pitch' in FIGS. 6 to 8 indicates the time interval required for the paper to pass through one pitch between the neighboring image forming stations (the tandem recording units) Pa to Pd.

When the writing addresses are set up, it is necessary to write the image data onto HD 33b so as to read the image data in harmony with the print timings of tandem recording units Pa to Pd taking into account the pitch of tandem recording units Pa to Pd located at regular intervals, as shown in FIG. 8. First, as shown in FIG. 6, in order to capture the YMCK image data, the original is scanned four times. The time required for each scanning is the time for the paper to make a movement with a distance grater than one pitch and shorter than the two pitches of the tandem recording units. As shown in FIG. 8, there is a period during which two tandem recording units perform printing in parallel during printing of MCK colors. Therefore, image data of two colors needs to be read in parallel, it is impossible to deal with the situation if the image data is written in HD 33b in the sequential order of the scanning and then the data is read sequentially.

For this reason, when the writing addresses are designated (Step S15/S23/S31/S39), the writing address in HD 33b is incremented by 2. This configuration enables alternate writing of different colors of data as shown in FIG. 7 when two colors of data need to be read in parallel from HD 33b.

In this way, when the address values are designated, the address value is incremented by 2 so as to write the subsequent color of data into the blank parts between storage locations of the preceding color of data without any overlap even during the period when the preceding color of data and the subsequent color of data need to be read in parallel. Thus, it is possible to efficiently read each color of the image data in an alternating manner.

Figure 9:
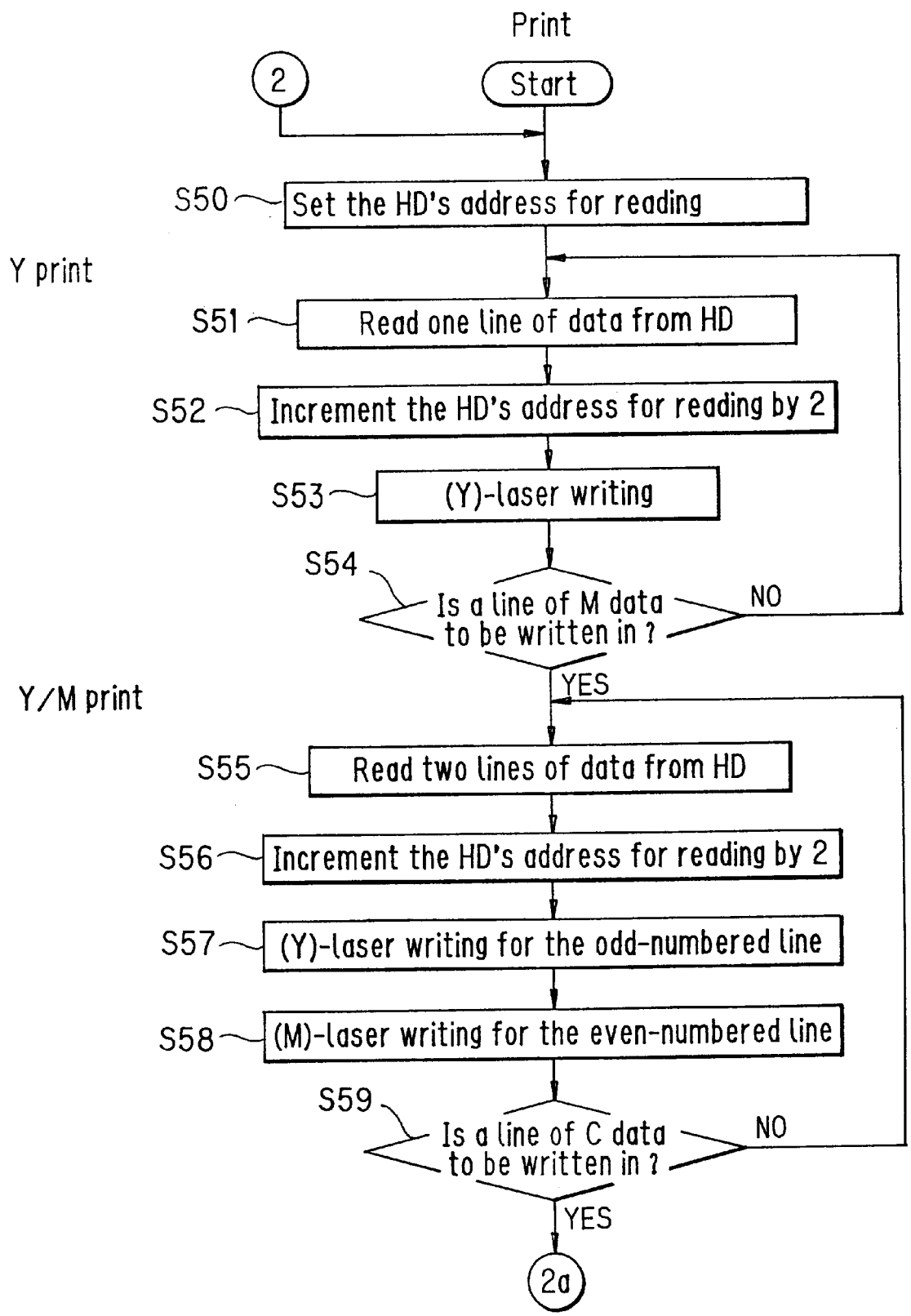
FIG. 9 is the first part of a flowchart for illustrating the operation of a CPU during printout in the first embodiment.
Figure 10:
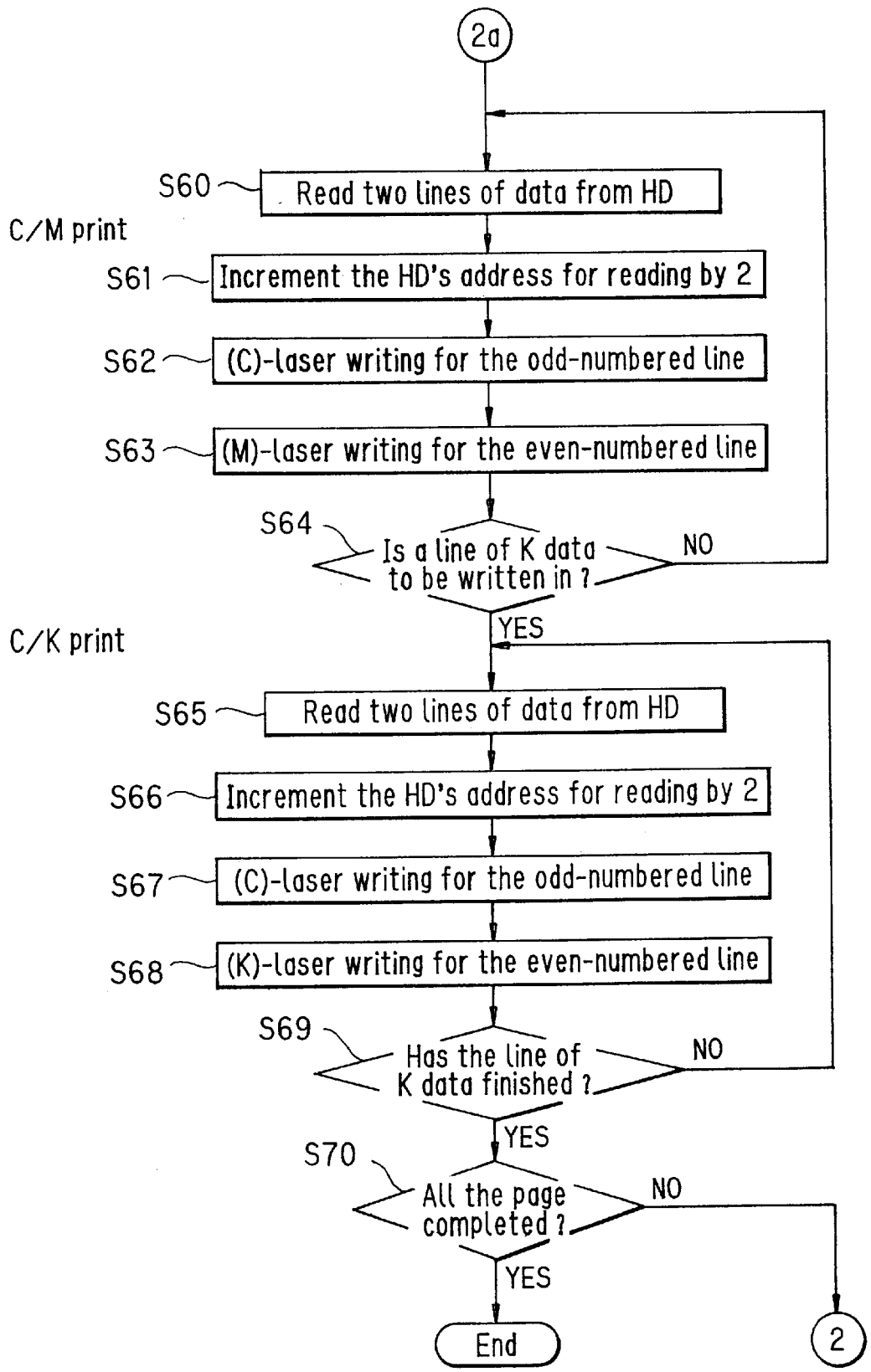
FIG. 10 is the second part of a flowchart (following that in FIG. 9) for illustrating the operation of a CPU during printout in the first embodiment.

Next, FIGS. 9 and 10 show a flowchart for illustrating the operation of a CPU during printout in the first embodiment. First, the reading address in HD 33b for each of the colors is set (Step S50). Then one line of the data is read from HD 33b (Step S51) and the (Y) address of HD 33b is incremented by 2 (Step S52). The read image data is supplied to (Y)-laser scan unit Pa (Step S53). Then it is judged whether there is any line of the M data to be written in (Step S54). If there is no line of the M data, the operation returns to Step S51. If there is a line of the M data to be written in, the operation goes to Step S55. The above steps S51 through S54 are repeated to implement the printout of Y.

Subsequently, two lines of data are read from HD 33b (Step S55). Then the address of HD 33b is incremented by 2 (Step S56) and the image data for the odd-numbered line is supplied to the (Y)-laser for recording (Step S57) while the image data for the even-numbered line is supplied to the (M)-laser for recording (Step S58). Then, it is judged whether there is any line of the C data to be written in (Step S59). If there is no line of the C data, the operation returns to Step S55. If there is a line of the C data to be written in, the operation goes to Step S60 (in FIG. 10). The above steps S55 through S59 are repeated to implement the printout of Y and M.

In the same manner, printing of C and M is implemented from Steps S60 through S64, and printing of C and K is implemented from Step S65 through S69. At Step S69, it is judged whether writing of K is completed in order to determine the end of printing for one page. Next, it is judged whether all the pages are completed (Step S70). If the judgment is negative, the operation goes to Step S50 to implement printout of the image of the next page. If the judgment is affirmative, the printout is ended.

FIG. 8 is a time chart of the operation for reading the image data from one HD. CPU 34 controls tandem recording units Pa, Pb, Pc and Pd so as to perform printing of respective colors, with a time shift one to the next of a period equal to the pitch of photoreceptor recording units.

Figure 11:
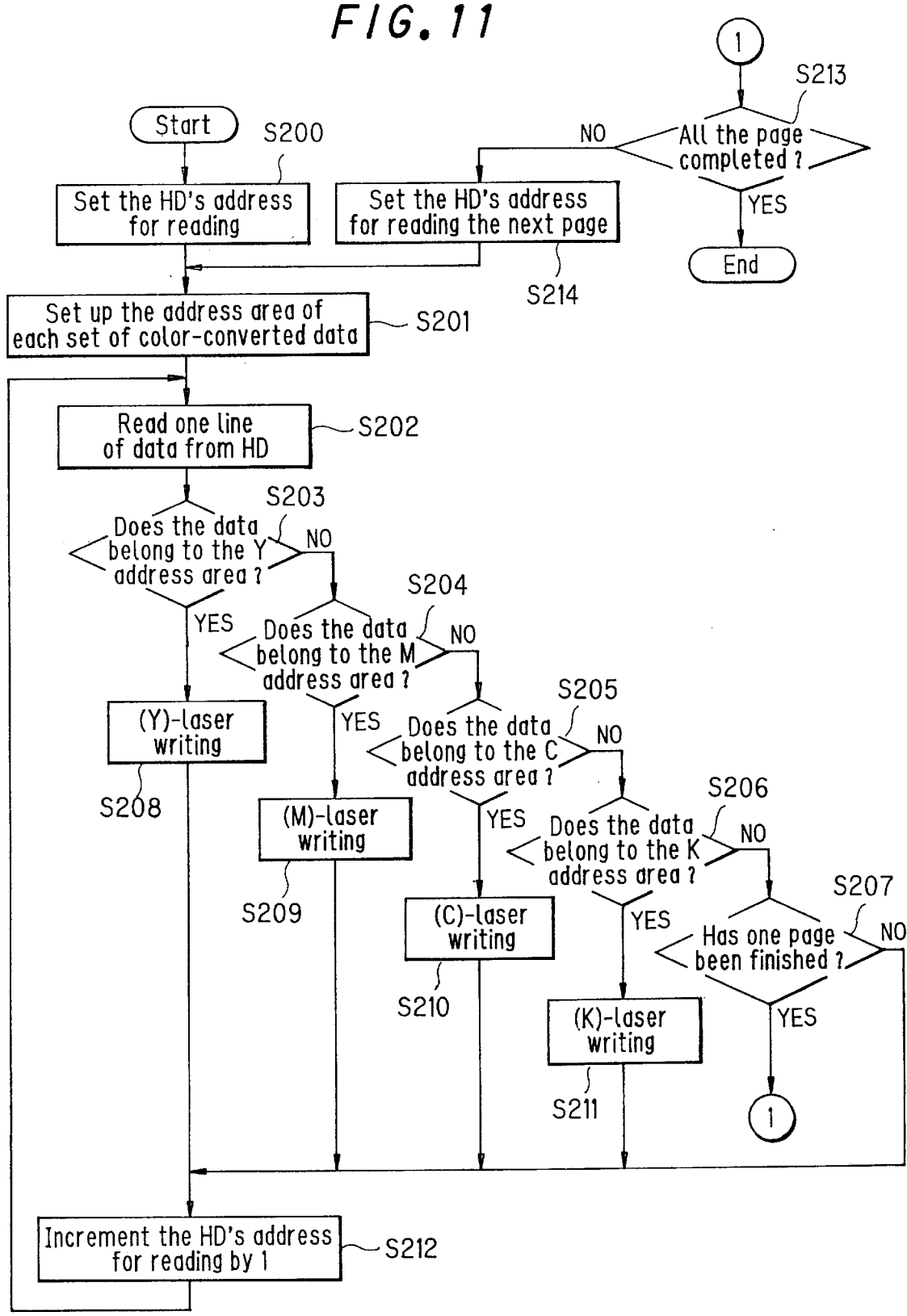
FIG. 11 is a flowchart for illustrating the operation of another CPU.

As another example of the CPU operation during printout will be explained with reference to FIG. 11. FIG. 11 is a flowchart showing the CPU operation. The address at which the color-converted image information of the first color has been stored on HD 33b is designated (Step S200). With this task, the address areas of the color-converted image information of the other colors are designated (Step S201). One line of the data is read from HD 33b (Step S202). Based on the address at which the data was read, it is distinguished which color (Y, M, C or B) the address belongs (Step S203 to S206) so that the data is supplied to the laser for recording that corresponds to the thus determined color (Step S208 through S211). The address value for reading in HD 33b is incremented by 1, then the operation returns to Step S202.

If the address area from which the data was read could not be identified, it is checked whether one page has been completed. If the judgment is negative, the operation goes to Step S212. If the judgment is affirmative, the operation goes to Step S213, where it is judged whether all the pages have been completed. If the judgment is negative, the address for reading the next page is set (Step S214), the operation returns to Step S201. When the judgment is affirmative, the operation is ended.

In this reading method, only the reading of the data in the order of address values is well enough to enable high speed reading and hence high speed printing.

(The Second Embodiment)

Figure 12:
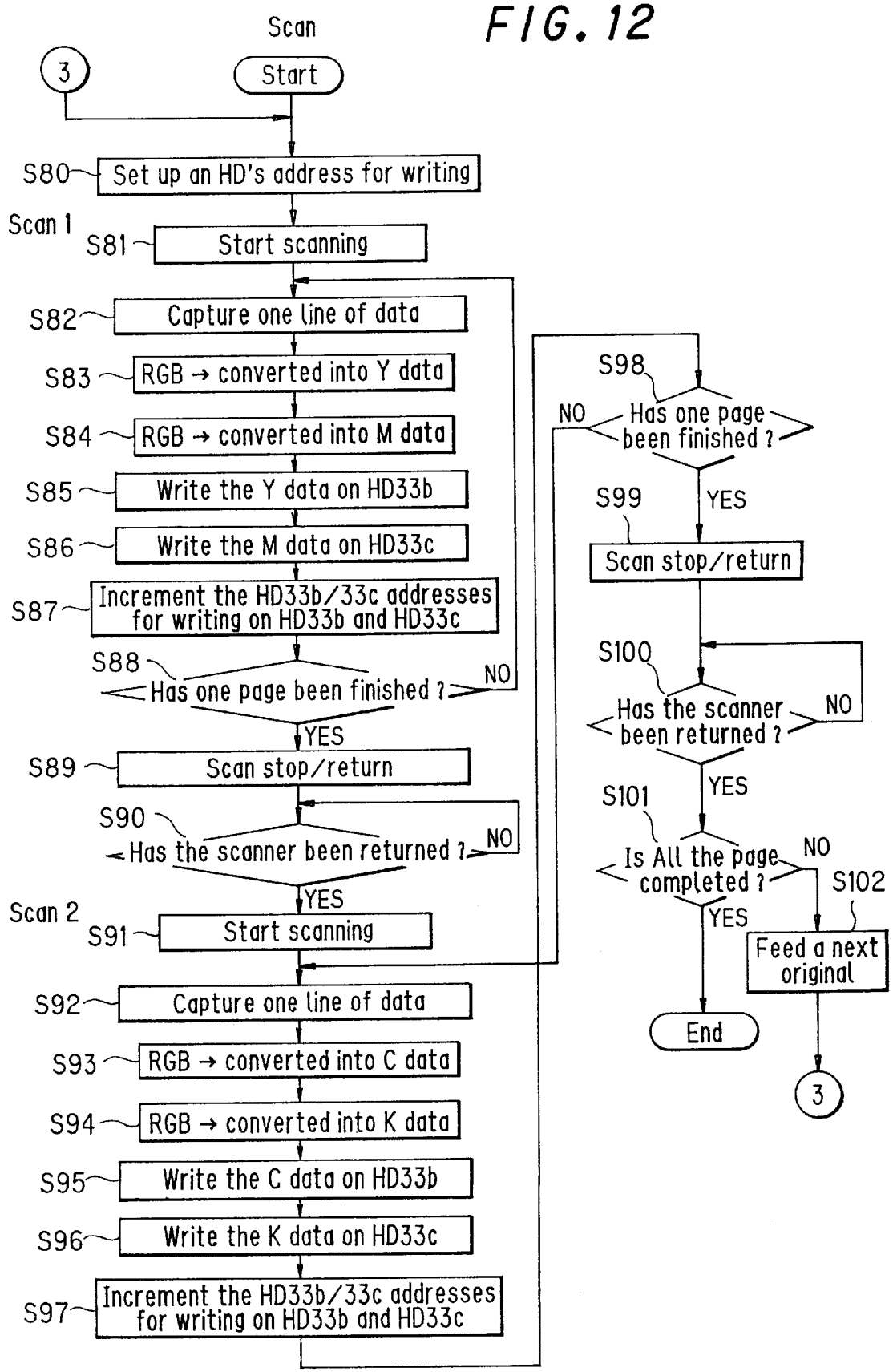
FIG. 12 is a flowchart for illustrating the operation of a CPU writing into a HD in the second embodiment.

The second embodiment is a digital color copier having two hard disk drivers 33b and 33c in FIG. 2. FIG. 12 shows a flowchart showing a write operation of the CPU into the HDs in accordance with the second embodiment.

In FIG. 12, the control during scanning the original will be explained. First, writing address values in HDs 33b and 33c are set up (Step S80) and scanning of the original is started by original scanner 4 (Step S81). Next, one line of the data is taken through image data input portion 30 (Step S82) into image processing portion 31 where the RGB data is converted into Y data (Step S83) and then the RGB data is converted into M data (Step S84). The thus converted Y data is written onto HD 33b (Step S85), and the M data is written onto HD 33c (Step S86). Then the address values for writing in HDs 33b and 33c are incremented by 1 (Step S87) and it is judged whether writing of the image data for one page has been completed (Step S88). When the judgment is negative, the operation returns to Step S82. When the judgment is affirmative, the operation goes to Step S89.

The above Steps S82 to S88 are repeated, to thereby perform the writing of one page of the Y data onto HD 33b and the writing of one page of the M data onto HD 33c, by the first scanning. When the image data of Y and M for one page has been completed, the forward movement of original scanner 4 along original table 2 is stopped so that it returns to the home position from where the original scanning is to be started (Step S89). Step S90 is the step of waiting for the completion of original scanner 4 to return to its home position. Similarly to the first scanning, the second scan is performed so that one page of the C data is written onto HD 33b and one page of the K data is written onto HD 33c, from Steps S91 to S100.

In the above way, the original is scanned two times by original scanner 4 to produce YMCK data, and the thus produced image data is successively stored into HDs 33b and 33c. Then, it is judged whether all the originals have been scanned by original scanner 4 (Step S101). If the judgment is negative, a next original is fed (Step S102) to return to Step S80, from where a similar scanning operation to the first original is effected for the next original. When the judgment is affirmative, the original scanning operation is ended.

Figure 13:
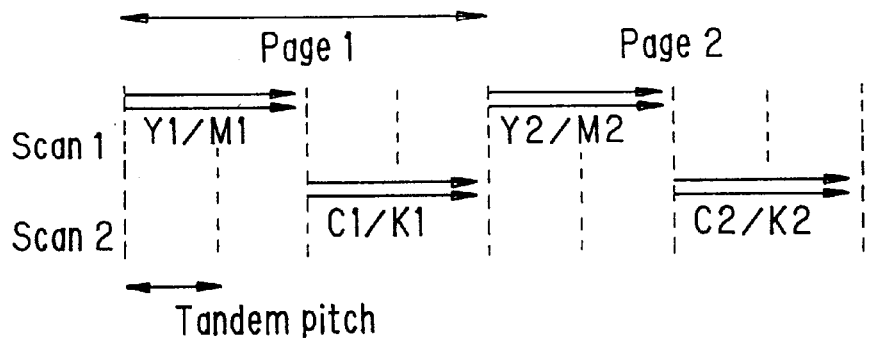
FIG. 13 is a timing chart showing the operation of capturing image data by scanning an original in the second embodiment.
Figure 14:
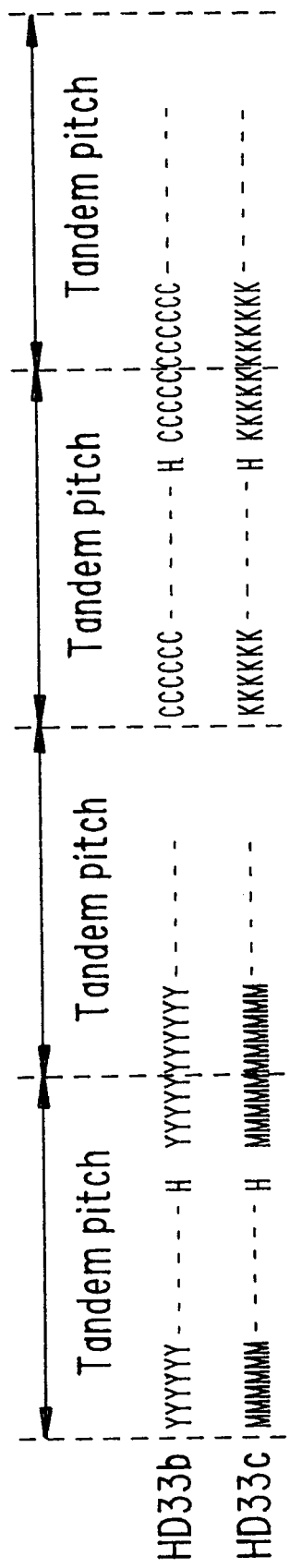
FIG. 14 is an illustrative diagram showing the order of writing of image data onto HDs in the second embodiment.

FIG. 13 is a chart showing the timing of capturing the image data in the first and second original scanning operations. FIG. 14 is an illustrative view showing the order of writing the image data onto the HDs.

As shown in FIG. 13, the first original scan captures the first (Y) and second (M) image information, and the second original scan captures the third (C) and fourth (K) image information. Then, as shown in FIG. 14, the first (Y) image information captured by the first original scan is recorded onto HD 33b and the second (M) image information is recorded onto HD 33c. The third (C) information captured by the second original scan is recorded onto HD 33b and the fourth (K) image information is recorded onto HD 33c.

Figure 15:
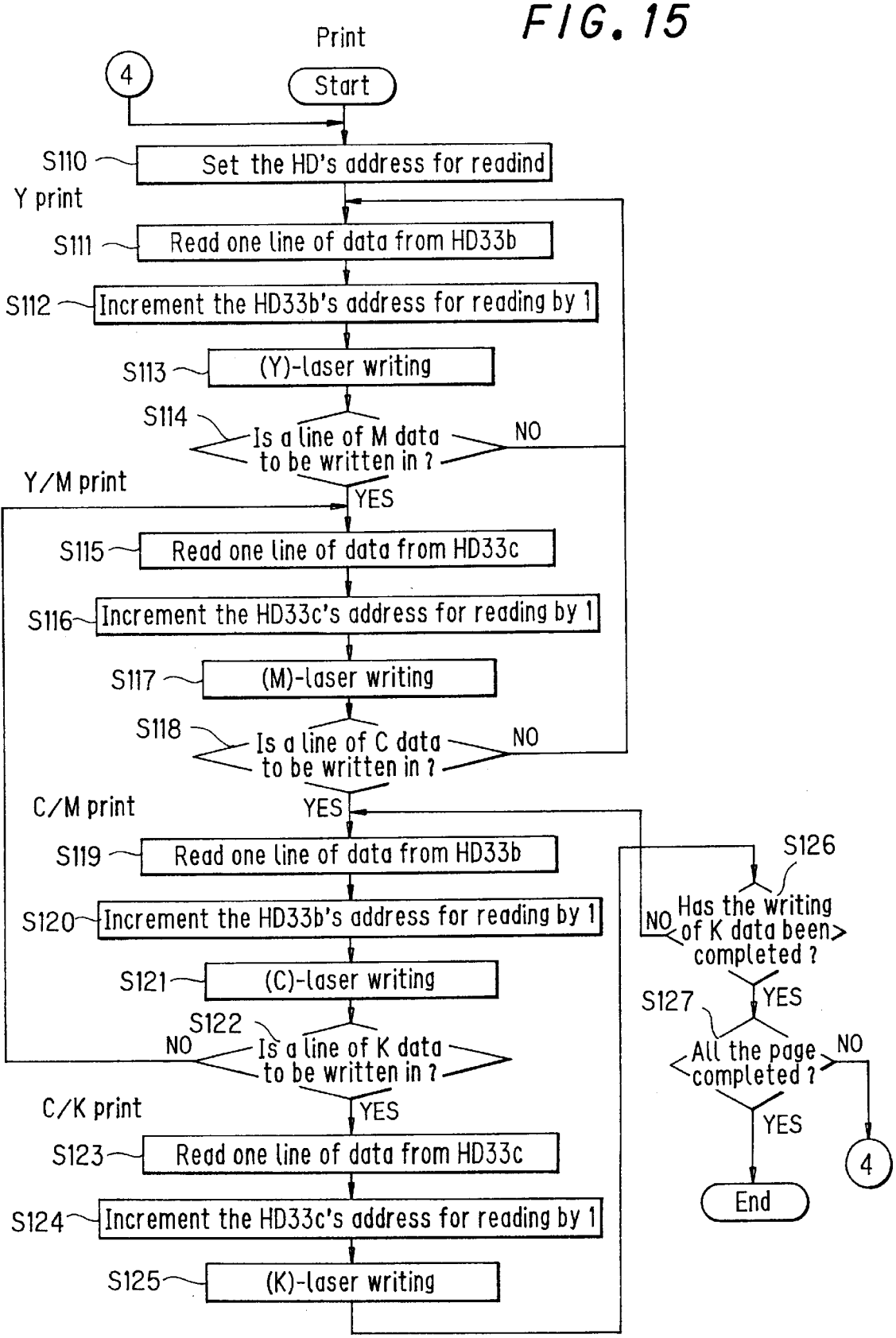
FIG. 15 is a flowchart for illustrating the operation of a CPU during printout in the second embodiment.

Next, FIG. 15 shows a flowchart for illustrating the operation of the CPU during printout in the second embodiment. First, the reading addresses in HDs 33b and 33c are set (Step S110). Then one line of the data is read from HD 33b (Step S111) and the address of HD 33b is incremented by 1 (Step S112). The read image data is supplied to the (Y)-laser for recording (Step S113). Then it is judged whether there is any line of the M data to be written in (Step S114). If there is no line of the M data, the operation returns to Step S111. If there is a line of the M data to be written in, the operation goes to Step S115. The above steps S111 through S114 are repeated to implement the printing of Y.

Subsequently, one line of the data is read from HD 33c (Step S115) and the address value of HD 33c for reading is incremented by 1 (Step S116). The read data is supplied to the (M)-laser for recording (Step S117). Then it is judged whether there is any line of the C data to be written in (Step S118). The above steps S111 through S118 are repeated to implement the printing of Y and M.

In the same manner, printing of C and M is implemented from Steps S115 through S122, and printing of C and K is implemented from Step S119 through S126. At Step S126, it is judged whether writing of K is completed in order to determine the end of printing for one page.

Next, it is judged whether all the pages are completed (Step S127). If the judgment is negative, the operation goes to Step S110 to implement printout of the next page. If the judgment is affirmative, the printout is ended.

Figure 16:
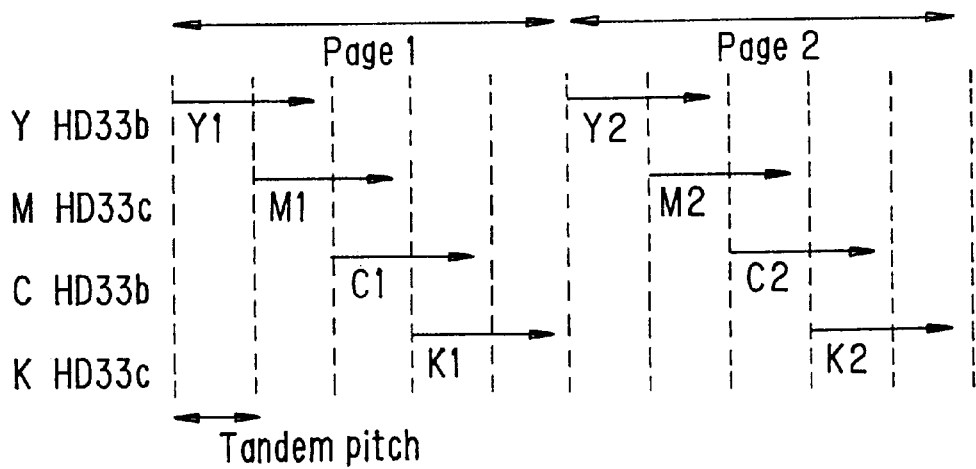
FIG. 16 is a time chart of the operation of reading the image data from two HDs in the second embodiment.

FIG. 16 is a time chart of the operation for reading the image data from two HDs. This time chart is to control the plurality of tandem recording units with two HDs so as to perform printing of respective colors, with a time shift one to the next of a period equal to the pitch of photoreceptor recording units.

(The Third Embodiment)

Figure 17:
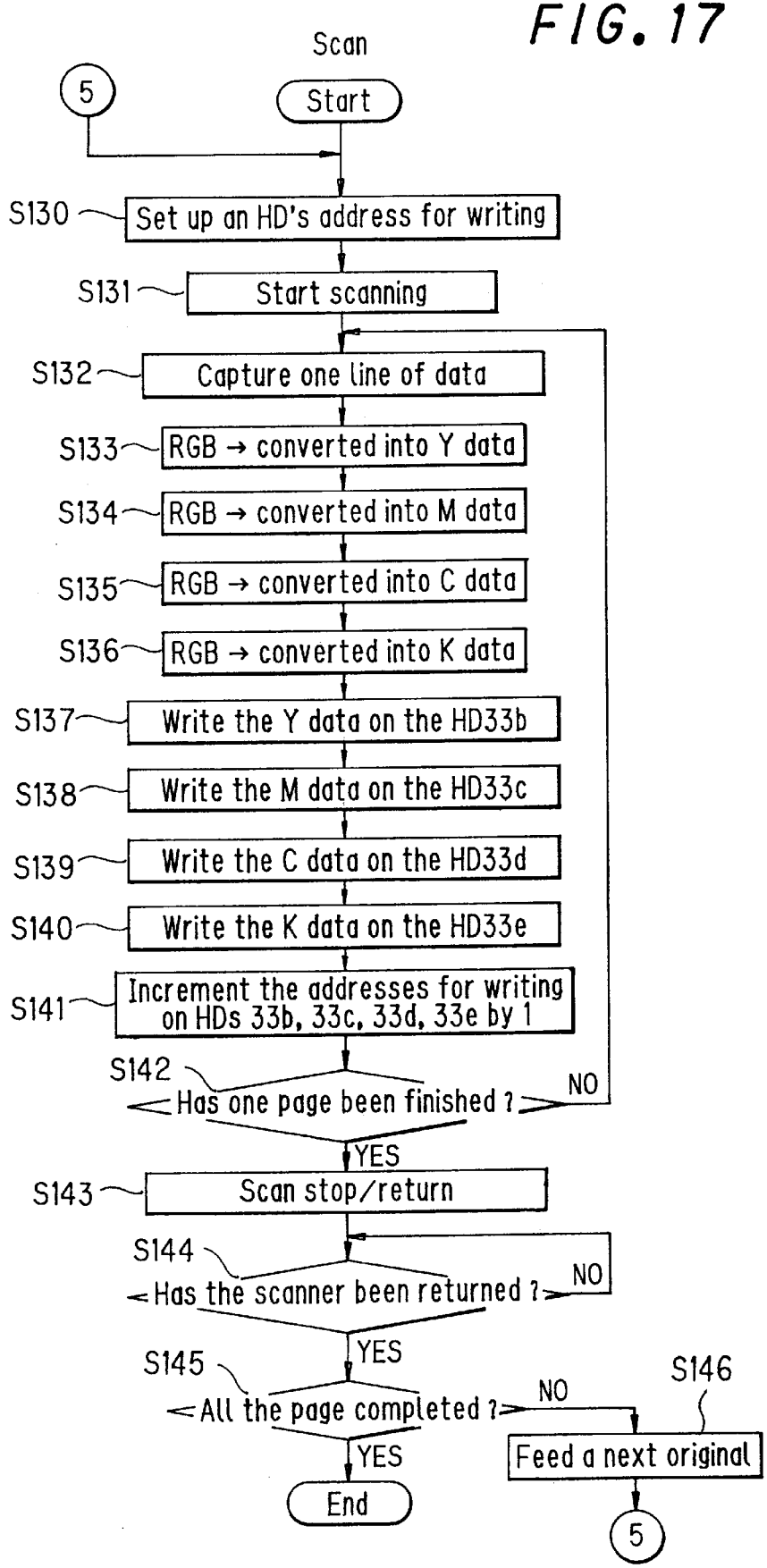
FIG. 17 is a flowchart for illustrating the operation of a CPU writing into HDs in the third embodiment.

The third embodiment is a digital color copier having four hard disk drivers 33b, 33c, 33d and 33e in FIG. 2. FIG. 17 shows a flowchart showing a write operation of the CPU into the HDs in accordance with the third embodiment.

In FIG. 17, the control during scanning the original image will be explained. First, writing address values in HDs 33b, 33c, 33d and 33e are set up (Step S130) and scanning of the original is started by original scanner 4 (Step S131). Next, one line of the data is taken in (Step S132) so that the RGB data is converted into the Y data (Step S133), the RGB data is converted into the M data (Step S134), the RGB data is converted into the C data (Step S135) and the RGB data is converted into the K data (Step S136), sequentially. Subsequently, the thus converted Y data is written onto HD 33b (Step S137), the M data is written onto HD 33c (Step S138), the C data is written onto HD 33d (Step S139) and the K data is written onto HD 33e (Step S140). Then the address values for writing in HDs 33b, 33c, 33d and 33e are incremented by 1 (Step S141) and it is judged whether writing of the image data for one page has been completed (Step S142).

The above Steps S132 to S142 are repeated, to thereby perform the writing of one page of the Y data onto HD 33b, the writing of one page of the M data onto HD 33c, the writing of one page of the C data onto HD 33d and the writing of one page of the K data onto HD 33e.

When one page of the image data has been written in, the movement of the scanner is stopped so as to return it to the home position from where the original scanning is to be started (Step S143). Step S144 is the step of waiting for the completion of original scanner 4 to return to its home position. When the scanner returns to the predetermined scan start position, the scanner stops.

In the above way, the original is scanned by a single scan to produce YMCK data, and the thus produced one page of image data is successively stored into HDs 33b, 33c, 33d and 33e.

Next, it is judged whether all the originals have been scanned (Step S145). If the judgment is negative, a next original is fed (Step S146) to return to Step S130, from where a similar scanning operation is effected for the next original. When the judgment is affirmative, the original scanning operation of the original scanner 4 is ended.

Figure 18:
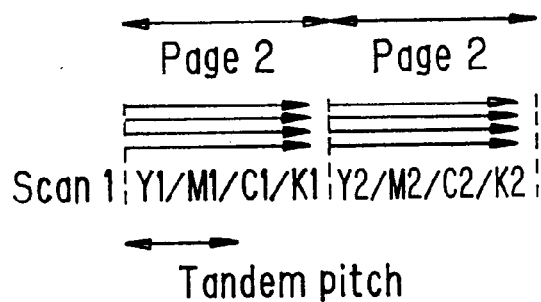
FIG. 18 is a timing chart showing the operation of capturing image data by scanning an original in the third embodiment.
Figure 19:
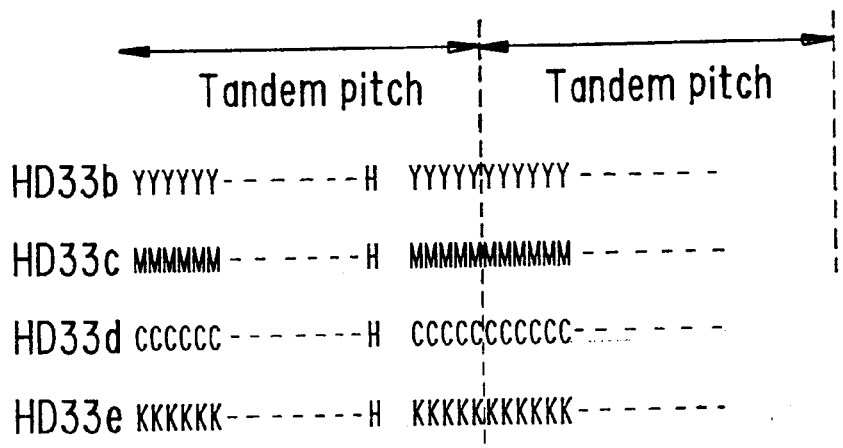
FIG. 19 is an illustrative diagram showing the order of writing of image data onto HDs in the third embodiment.

FIG. 18 is a chart showing the timing of capturing the image data during the original scanning operation. FIG. 19 is an illustrative view showing the order of writing the image data onto the HDs.

As shown in FIG. 18, when plural HDs 33b, 33c, 33d and 33e are used to store and control the different colors of the image data, the same type of HDs having identical characteristics are employed, whereby the writing and reading of the image data are efficiently processed in parallel and with the same timing. Accordingly, the performance of the image forming apparatus can be optimized.

Further, when plural HDs are used to store and control the different colors of the image data, HDs having performances higher than a certain level, or the performances greater than the processing rate of image forming in the image forming apparatus, are adopted, whereby it is possible to keep the balance of the performance with that of the image forming apparatus.

Figure 20:
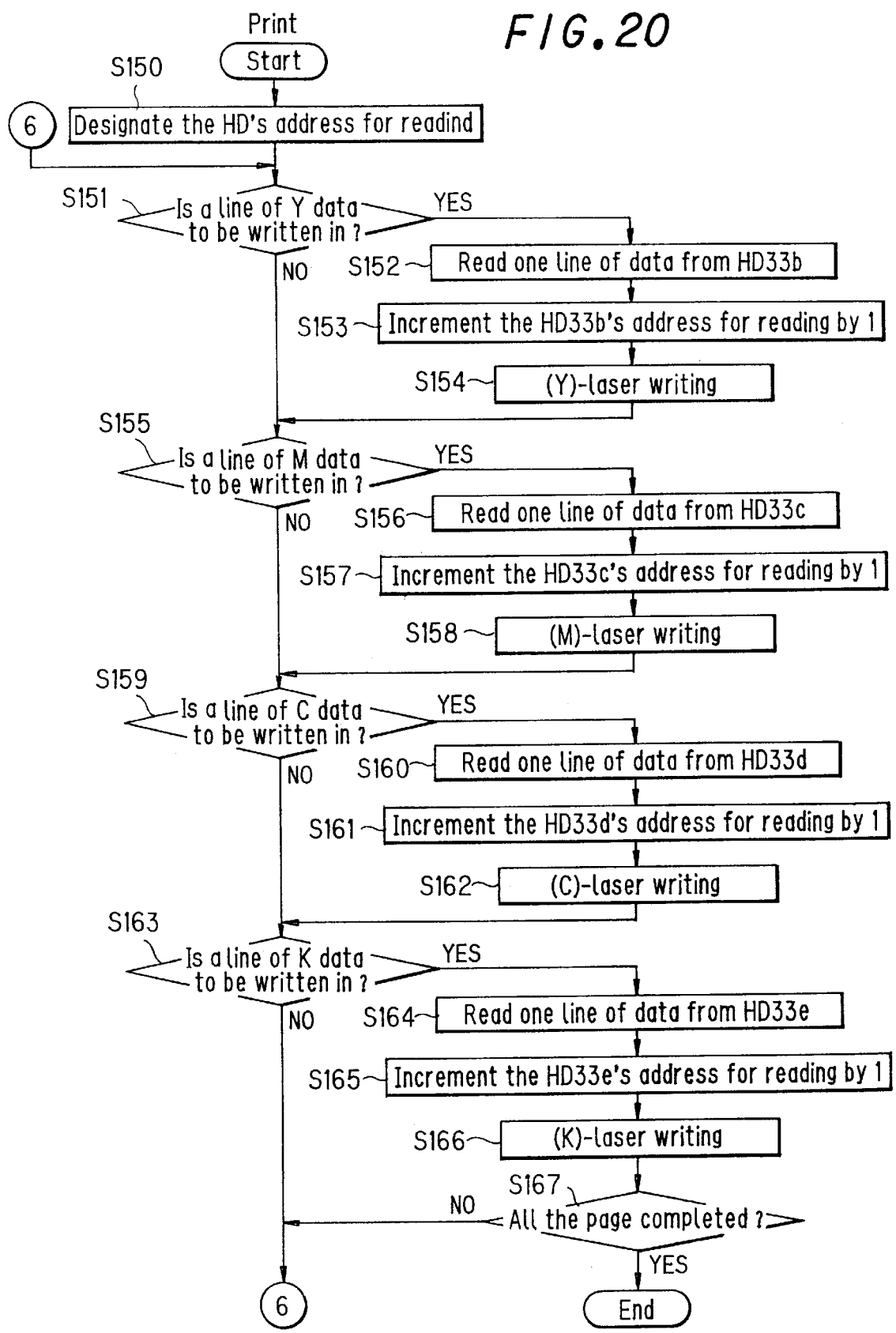
FIG. 20 is a flowchart for illustrating the operation of a CPU during printout in the third embodiment.

Next, FIG. 20 shows a flowchart for illustrating the operation of a CPU during printout in the third embodiment. First, the reading addresses in HDs 33b, 33c, 33d and 33e set (Step S150). Then it is judged whether there is any line of the Y data to be written in (Step S151). When the judgment is affirmative, one line of the data is read from HD 33b (Step S152), and the address value of HD 33b is incremented by 1 (Step S153) while the data is supplied to the (Y)-laser for recording (Step S154). Subsequently, it is judged whether there is any line of the M data to be written in (Step S155). If there is a line of the M data to be written in, the data of HD 33c is supplied to the (M)-laser for recording (Steps S156 to 158).

Further, it is judged whether there is any line of the C data to be written in (Step S159). If there is a line of the C data to be written in, the data of HD 33d is supplied to the (C)-laser for recording (Steps S160 to 162). Then, it is judged whether there is any line of the K data to be written in (Step S163). If there is a line of the K data to be written in, the data of HD 33e is supplied to the (K)-laser for recording (Steps S164 to 166).

Finally, it is judged whether all the pages are completed after the line of the K data has been written in (S167). If the judgment is negative, the operation goes to Step S151 to continue printing. If the judgment is affirmative, the printout is ended.

Figure 21:
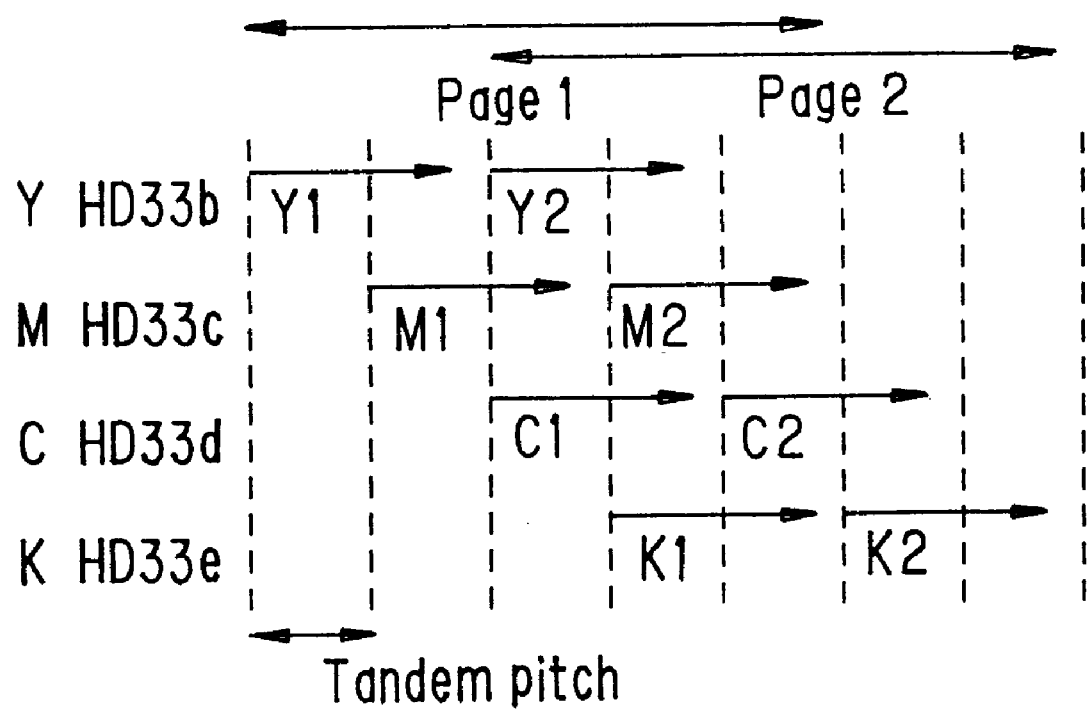
FIG. 21 is a time chart of the operation of reading the image data from four HDs in the third embodiment.

FIG. 21 is a time chart of the operation for reading the image data from four HDs. This time chart is to control the plurality of tandem recording units Pa, Pb, Pc and Pd with four HDs so as to perform printing of respective printing of colors, with a time shift one to the next of a period equal to the pitch of photoreceptor recording units.

In accordance with the first, second and third aspects of the invention, the addresses of the data are set up in accordance with the number of the color-converted sets of image information to be retrieved in parallel from the rotary type storage means by the reading means, in such a manner that color-converted sets of image information of different colors are written into the rotary type storage means, in an alternating manner. Accordingly, it is possible to control storage of large size image information in such a manner that when the color-converted sets of image information of plural colors need to be read in parallel during image forming, color-converted sets of image information of plural colors can be read out with almost the same timing. Accordingly, it is possible to read out the color-converted sets of image information of plural colors, at high speed and hence achieve fast image forming of a color image.

In accordance with the fourth and fifth aspects of the invention, the reading means reads out the color-converted image information written in the rotary type storage means, by successively designating the addresses therein, thus enabling high speed retrieval of the data from the rotary type storage means.

In accordance with the sixth aspect of the invention, the input color-separated sets of image information are color converted and the color-converted sets of image information are controlled so as to be stored into respective rotary storage media, by taking into account the necessary order of the recorded sets of image information. Accordingly, high-speed writing and high-speed reading the data can be performed with the minimum number of rotary storage media so that a color image of high quality and hence of a large data size, can be processed efficiently. Further, since the color-converted sets of image information are stored into plurality of independent rotary storage media, it is possible to effect the writing and reading processes of the image information so as not to coincide with one another. As a result, it is possible to efficiently write in and read out large-sized image information.

In accordance with the seventh aspect of the invention, the writing time and reading time of image information required for the plurality of rotary storage media are all approximately equal to one another. Accordingly, writing and reading of the image information for all the rotary storage media can be controlled with the same timing, thus making it possible to simplify the control of the processing without any stoppage and hence efficiently read the color image.

In accordance with the eighth aspect of the invention, the writing means stores the color-converted sets of image information required for the image forming units into respective rotary storage media, in the order of the arrangement of the image forming units. Accordingly, the only needed process is mere reading of the image information in the storing order and subsequent transfer of the data to the image forming units. Thus, the process can be simplified so as to enhance the processing efficiency of large size image information.

In accordance with the ninth aspect of the invention, a plurality of rotary storage media are adapted to independently control the storage of the image information. Accordingly, the overlaps between the processing of storing the image information captured by the scanner and the processing of reading the image information and subsequent data transfer can be avoided as much as possible, therefore it is possible to perform the operation of the machine without stoppage. Thus, the processing efficiency of large size image information can be improved.

In accordance with the tenth aspect of the invention, color-converted sets of image information required for the first and third image forming units are stored into the first storage medium and color-converted sets of image information required for the second and fourth units are stored into the second storage medium. Accordingly, it is possible to efficiently effect the processing of storing the image information and the reading and subsequent transfer of the image information and hence read the color image efficiently.

What is claimed is:

1. A color image forming apparatus comprising:
   an input means for capturing color image information as color-separated sets of image information;
   a color converting means for color-converting the color-separated sets of image information input through the input means into color-converted sets of image information;
   a rotary type storage means for storing the color-converted sets of image information;
   a writing means for writing plural color-converted sets of grouped image information, onto the rotary type storage means;
   a reading means for reading the color-converted sets of image information from the rotary type storage means; and
   color image forming means for reproducing different color images corresponding to the color-converted sets of image information, retrieved by the reading means, wherein the writing means can designate addresses at which color-converted sets of image information of different colors are written on the rotary type storage means in an alternating or cyclic manner in accordance with the number of the color-converted sets of image information to be read in parallel from the rotary type storage means by the reading means.

2. The color image forming apparatus according to claim 1, wherein the writing means separates the addresses into a first group of addresses and a second group of addresses so that the first and second groups of addresses are successively and alternately set up for the color-converted sets of image information.

3. The color image forming apparatus according to claim 1, wherein the writing means separates the addresses into a first group addresses and a second group of addresses and further separates the color-converted sets of image information into a first set of image information and a second set of image information based on the color so that the first set of image information and the second set of image information are successively written into the storage locations at the first and second group addresses, respectively.

4. The color image forming apparatus according to claim 1, 2 or 3, wherein the reading means sequentially designates addresses for each color based on the addresses set up by the writing means so as to successively retrieve color-converted sets of image information, separately for each color and supply the retrieved sets of image information to the respective color image forming means.

5. The color image forming apparatus according to claim 1, wherein the writing means sets up and controls addresses of the areas to which each color-converted set of image information of a color is written in, and the reading means reads the color-converted sets of image information by sequentially designating addresses and determines which color the retrieved color-converted set of image information corresponds to based on the address area set up by the writing means and supplies each set of image information of a color to the color image forming means corresponding to the color.

6. A color image forming apparatus comprising:
   an input means for capturing color image information as color-separated sets of image information;
   a color converting means for color-converting the color-separated sets of image information input through the input means into color-converted sets of image information;
   a rotary type storage means for storing the color-converted sets of image information;
   a writing means for writing plural color-converted sets of grouped image information, onto the rotary type storage means;
   a reading means for reading the color-converted sets of image information from the rotary type storage means; and
   a color image forming means for reproducing different color images corresponding to the color-converted sets of image information, retrieved by the reading means, wherein the rotary type storage means is composed of a plurality of rotary storage media which each separately stores a first color-converted set of image information to be used for image forming at an odd-numbered order and a second color-converted set of image information to be used for image forming at an even-numbered order; the writing means writes the color-converted sets of image information to the corresponding rotary storage media in the rotary type storage means; and the reading means sequentially reads color-converted sets of image information from respective rotary storage media, in the necessary order when the color image forming means needs to perform image forming.

7. The color image forming apparatus according to claim 6, wherein the writing time and reading time of image information for the plurality of rotary storage media are all approximately equal to one another.

8. The color image forming apparatus according to claim 6, wherein the color image forming means comprises a plurality of image forming units arranged one to the next so that each unit reproduces a different color image; the writing means stores the color-converted sets of image information required for the image forming means into respective rotary storage media, in the order of the arrangement of the image forming units.

9. The color image forming apparatus according to claim 6, wherein the input means is a scanning-type color scanner for scanning the original image surface and capturing the color separations of the original image; and the writing means writes the color-converted sets of image information captured for each scanning of the input means, into the respective rotary storage media.

10. The color image forming apparatus according to claim 6, wherein the color image forming means is composed of the first through fourth image forming units arranged one to the next so that each unit reproduces a different color image; the rotary type storage means is composed of the first and second storage media; and the writing means is constructed so that color-converted sets of image information required for the first and third image forming units are stored into the first storage medium and color-converted sets of image information required for the second and fourth units are stored into the second storage medium.

* * * * *